Sept. 5, 1961 J. H. KUCK ET AL 2,999,211

GASEOUS RELAXATION PULSE GENERATOR WITH OUTPUT TAKEN FROM SCREEN GRID

Filed July 12, 1951

INVENTORS
JOHN H. KUCK
WILLIAM M. McCORD

BY [signature]

ATTORNEY

United States Patent Office 2,999,211
Patented Sept. 5, 1961

2,999,211

GASEOUS RELAXATION PULSE GENERATOR WITH OUTPUT TAKEN FROM SCREEN GRID

John H. Kuck, Silver Spring, and William M. McCord, Hyattsville, Md., assignors to the United States of America as represented by the Secretary of the Navy Filed July 12, 1951, Ser. No. 236,382
3 Claims. (Cl. 331—129)

The present invention relates generally to pulse generators and more particularly to an electronic circuit for generating regular electrical pulses of short duration.

It is an outstanding object of this invention to provide a simple and compact circuit that will produce positive pulses.

It is a further object of the invention to provide a relaxation oscillator using a single tube and a directly heated cathode.

Another object of the present invention is to provide a relaxation oscillator which uses a gas-filled tetrode as its only tube and which generates a signal of substantial amplitude.

Although the novel features which are believed to be characteristic of this invention will be particularly pointed out in the claims appended hereto, the invention itself, as to its objects and advantages, the mode of its operation, and the manner of its organization may be better understood by reference to the following description taken in connection with the accompanying drawings forming a part thereof, in which:

In the operation of many devices, and particularly in proximity fuzes, there is need for a generator of positive electrical pulses, but, in the past, relatively complicated circuits have been necessary for such use. These generally made use of several electron tubes or of tubes having indirectly heated cathodes. Inasmuch as the space available in proximity fuzes and the like is extremely limited, it is important that all components be as small and simple as possible and, for this reason, a single-tube, positive-pulse generator is very desirable. The prior art circuits which obtained positive pulses from the control grid gave pulses that were very short and extremely unreliable, since the tube had to be operated at low filament voltage to get appreciable pulses; this was because they depended on the grid to actually attain a positive potential with respect to the filament and this potential (which was somewhere between the grid and plate potential) had to disappear again in the very short time required for the plate capacitor to discharge. Thus, the pulse was not only very short, but its height depended in all probability on various factors inside the tube.

Another prior art device obtains a positive pulse across a resistor in the cathode circuit. Such a circuit is not applicable to the proximity fuze because in that use the cathode must be at ground potential since the negative sides of the A and B batteries are attached to a common point (that is, tied together within the battery) and also, the cathode should be directly heated and so must be connected to ground potential.

The underlying purpose of this invention is to produce a positive pulse by using a single tube having a directly-heated, grounded cathode. This is accomplished, as will be explained further, by having the screen grid become the source of the desired pulses. For that reason, the screen grid is biased negatively so that it will immediately swing positive when the tube is fired by a relaxation circuit connected in the plate supply lead. This arrangement obviates the difficulties recited above as found in prior art devices in a manner to be described below.

Figure 1:
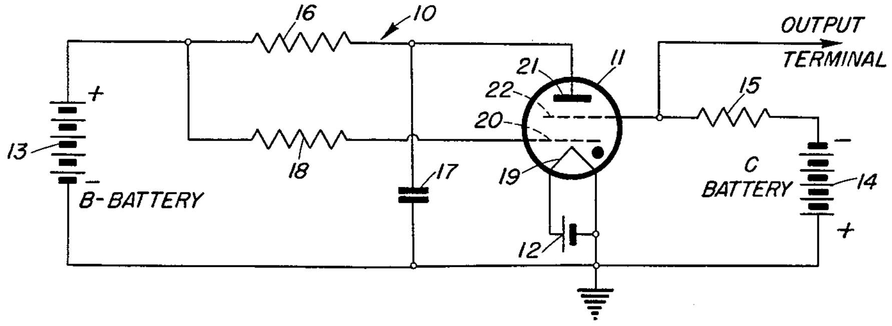
FIG. 1 is a circuit diagram of a specific embodiment of the present invention.

Referring first to FIG. 1, which best shows the present invention, the circuit illustrated is generally designated 10 and includes a thyratron 11, an A-battery 12, a B-battery 13, and a C-battery 14. The tube 11 is a gas-filled tetrode of the directly-heated cathode type. Additional features of the tube will be described in more detail hereinafter. The A-battery 12 serves to heat the cathode of the tube and is so connected. The C-battery 14 is connected, as shown, with the positive terminal grounded and connected to the filament and the negative terminal connected to the screen grid through a resistor 15 which has a resistance of the order of 11,000 ohms. The C-battery may have a voltage of from 12 to 22.5 volts and normally maintains the screen grid at a corresponding negative bias.

The B-battery 13, suitably having a value of 120 to 200 volts, has its negative terminal grounded and its positive terminal connected to the anode of the tube through a resistor 16 which has a relatively high resistance, of the order of one-half megohm. A capacitor 17 is connected between the anode and ground and forms an R-C circuit with said resistor 16.

The control grid is connected to the positive terminal of the B-battery through the resistor 18, which resistor is in the order of 110,000 ohms. It should be understood, of course, that the numerical values given are merely illustrative and they will vary with the use and the type of electron tube. An output terminal is attached to the screen grid and the generated pulse is taken from there to ground.

Figure 7:
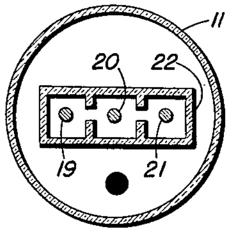
FIG. 7 is a transverse sectional view of a four-element thyratron suitable for use in the circuit of the invention.

The characteristics of the tube 11 can best be understood by reference to FIG. 7 which shows a transverse sectional view thereof. The cathode 19, the grid 20, and the anode 21 are of thin, elongated, cylindrical shape and extend longitudinally of the tube. The screen grid 22 is shown as a box-like enclosure surrounding all the elements and having apertured partitions extending between the cathode and grid and between the grid and plate. It can be seen that the screen exerts a shielding effect on the grid-cathode portion as well as on the plate-grid portion, the latter being true in most tubes having screens, but the former being found in relatively few types of electron tubes. It can be seen, then, that one of the characteristics of a tube that may be used in this circuit is that the screen must exert sufficient influence over the emission of electrons from the cathode to prevent the tube from firing even when the grid is biased to a high positive value; the reason for this will be evident from the description of the operation of the pulse generator.

Figure 2:
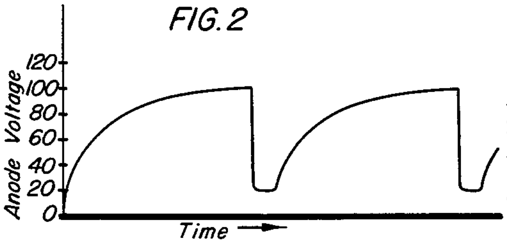
FIG. 2 is a graph of the relationship between anode voltage and time during the operation of the embodiment of FIG. 1.
Figure 3:
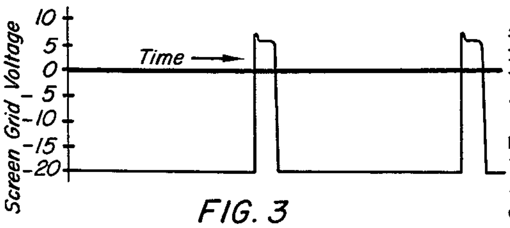
FIG. 3 is a graph of the relationship between screen grid voltage and time during the operation of the embodiment of FIG. 1.

The operation of the circuit shown in FIG. 1 is as follows: Assuming that the cathode is heated and that the B- and C-batteries are operative and connected properly, the capacitor 17 will charge slowly through the resistor 16 so that the voltage of the anode of the tube 11 will rise gradually, according to the exponential curve shown in FIG. 2; while this is happening the entire B-battery voltage exists between the control grid and the cathode. As soon as the anode reaches a sufficient voltage, the tube will become ionized and will fire, discharging the capacitor 17 through the anode-cathode circuit. During this discharge, the potential of the screen grid will become positive briefly. Normally the screen grid is biased to the voltage of the negative terminal of the C-battery, but due to the resistance provided by the resistor 15, which prevents sudden restoration of the said bias when disturbed momentarily, the screen grid will thus remain positive for a short time. This is shown in FIG. 3, where the normal voltage of the screen grid is shown as −20 volts and the pulse voltage is about +5 volts; while the anode is at its lowest voltage at the end of the firing, as shown in FIG. 2, the screen grid will for a short time be positive, as shown in FIG. 3. This cycle repeats itself automatically by reason of the R-C circuit and, thus, the screen grid becomes a source of the desired positive pulses, the frequency of said pulses being determined by the R-C circuit parameters. The amplitude of the pulse is controlled by the value of the screen grid bias and varies in the same sense as said bias. The duration of the pulse is a function primarily of the de-ionization time of the tube and is of the order of microseconds.

Figure 5:
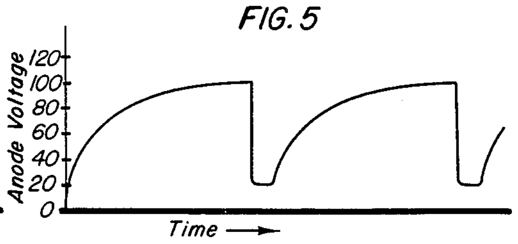
FIG. 5 is a graph of the relationship between anode voltage and time during the operation of the embodiment of FIG. 4.
Figure 6:
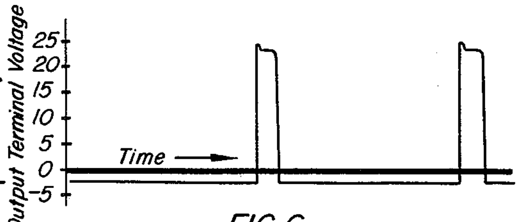
FIG. 6 is a graph showing the relationship between the output terminal voltage and time during the operation of the embodiment of FIG. 4.
Figure 4:
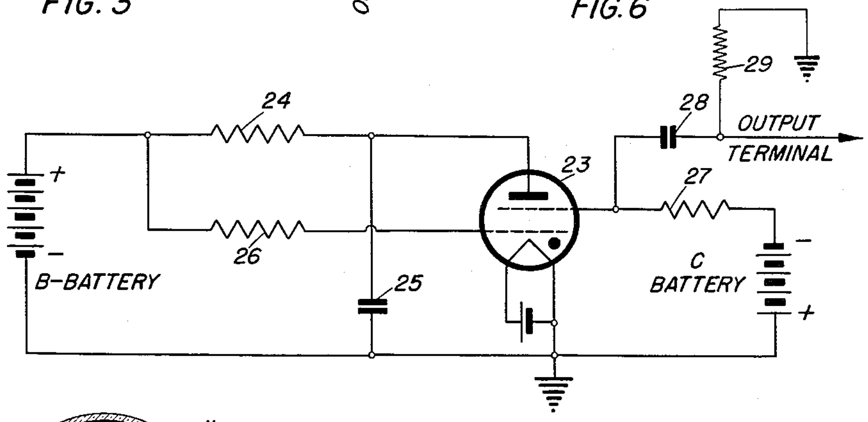
FIG. 4 is a circuit diagram of another embodiment of the invention.

The circuit shown in FIG. 4 is a slight variation of that shown in FIG. 1. As in the preceding circuit, a tube 23 is provided with A, B, and C batteries, a relaxation circuit made up of resistor 24 and capacitor 25, a control grid resistor 26, and a screen grid resistor 27, connected in the manner indicated. In addition, a capacitor 28 is placed in the lead to the output terminal and a bleeder resistor is connected to ground. When the circuit is operated as described above, the output terminal will have only a small normal negative bias and the positive pulse will appear as of a large positive value. This is indicated in FIGS. 5 and 6. From an examination of these graphs it can be seen that the positive pulse appearing on the output terminal corresponds in time with the firing of the tube.

In both of the above circuits it would appear that the fact that the control grid is always at B+ bias would mean that the tube would always be firing. However, the screen grid has a sufficient shielding effect over the grid to prevent it from firing the tube even when the grid is biased to the value which, when impressed on the anode, ultimately fires the tube.

Obviously many modifications and variations of the present invention are possible in the light of the above teachings. It is therefore to be understood that within the scope of the appended claims, the invention may be practiced otherwise than as specifically described.

What is claimed is:

1. In a pulse generator comprising a single gas-filled tube having a directly-heated, grounded cathode, an anode, a control grid, and a screen grid, a source of direct current potential, circuit means connecting said source and said tube in a relaxation system, said circuit means including a storage device connected between the anode and cathode, and means for charging said device at a predetermined rate, a source of negative potential, connections including a series connected impedance impressing said negative potential on said screen grid, and a pulse output circuit connected between said impedance and said screen grid.

2. A pulse generator comprising a gas-filled electron tube having a directly-heated, grounded cathode, a control grid, a screen grid, and an anode, said screen grid being arranged to exert a shielding effect between the control grid and cathode as well as between the control grid and anode, a B-battery having its negative terminal connected to ground and its positive terminal to the control grid through a first resistor, a second resistor connected from the positive terminal of the B-battery to the anode, a capacitor connected from the anode to ground, a C-battery having its positive terminal connected to ground, and an impedance connected from the negative terminal of the C-battery to the screen grid, the generated pulse being taken between the screen grid and ground.

3. In a pulse generator comprising a single gas-filled tube having a directly-heated, grounded cathode, an anode, a control grid, and a screen grid in said tube, a source of direct current potential, circuit means connecting said source and said tube in a relaxation system, said means including a capacitor connected between the anode and cathode, and means for controlling the charging rate of the capacitor, a source of negative potential, connections including an impedance connected in series circuit relation between said source and said screen grid impressing said negative potential on said screen grid, a pulse output circuit connected between said impedance and said screen grid, and a capacitor connected in series circuit relation in said output circuit.

References Cited in the file of this patent

UNITED STATES PATENTS

| | | |
|---|---|---|
| 2,148,096 | Banks | Feb. 21, 1939 |
| 2,543,730 | Muchmore | Feb. 27, 1951 |
| 2,627,025 | Trembly | Jan. 27, 1953 |